US012670281B2

(12) United States Patent
Evangelista et al.

(10) Patent No.: US 12,670,281 B2
(45) Date of Patent: Jun. 30, 2026

(54) COMPUTING SYSTEMS AND METHODS FOR AUTOMATIC FILE TOKENIZATION

(71) Applicant: The Toronto-Dominion Bank, Toronto (CA)

(72) Inventors: Maria Nimpha Evangelista, Toronto (CA); Jingqin Qian, Markham (CA); Bhanu Ajay Kesani, Oshawa (CA); Jack C. Anderson, Mooresville, NC (US); Samaneh Miri-Ashtiani, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 25 days.

(21) Appl. No.: 18/445,916

(22) Filed: Mar. 27, 2024

(65) Prior Publication Data

US 2025/0307442 A1    Oct. 2, 2025

(51) Int. Cl.
*G06F 21/62* (2013.01)

(52) U.S. Cl.
CPC ............................... *G06F 21/6218* (2013.01)

(58) Field of Classification Search
CPC ........... G06F 21/6245; G06F 16/90344; G06F 16/28; G06F 16/2255; G06F 21/6227; G06F 2221/2107; G06F 16/258
See application file for complete search history.

(56) References Cited

U.S. PATENT DOCUMENTS

| | | |
|---|---|---|
| 7,412,541 B1 | 8/2008 | Stadler et al. |
| 10,379,995 B1 | 8/2019 | Walters et al. |
| 10,910,089 B2 | 2/2021 | Austin et al. |
| 11,227,068 B2 | 1/2022 | Parthasarathy |
| 11,843,599 B2 | 12/2023 | Praszczalek et al. |
| 12,164,542 B1 | 12/2024 | Rahman |
| 2017/0272472 A1* | 9/2017 | Adhar ................... G06F 21/602 |
| 2022/0343015 A1* | 10/2022 | Shahin .................. H04L 9/0643 |
| 2022/0398340 A1 | 12/2022 | Jakobsson et al. |
| 2022/0407702 A1 | 12/2022 | Jakobsson et al. |
| 2023/0035507 A1 | 2/2023 | Mohammed et al. |

(Continued)

FOREIGN PATENT DOCUMENTS

| | | |
|---|---|---|
| WO | 2023069689 A2 | 4/2023 |
| WO | 2023163960 A1 | 8/2023 |

*Primary Examiner* — Ajay M Bhatia
*Assistant Examiner* — Cindy Nguyen
(74) *Attorney, Agent, or Firm* — NIXON PEABODY LLP

(57) ABSTRACT

A file tokenization application is provided that obtains a data record, such as a table, comprising groupings of data elements. The file tokenization application may be used to tokenize and detokenize data for use in artificial intelligence applications. Each one of the groupings of data elements are associated with a data type. The application selects a first template for tokenization based on at least a first data type associated with a first given grouping of data elements from amongst the groupings of data elements. The first template comprises a first tokenization rule and a first detokenization rule. The file tokenization application tokenizes at least a portion of each of the data elements in the first grouping of data elements to generate a tokenized data record and associated tokenization file, which comprises the first detokenization rule and the data record. The file tokenization application then transmits the tokenized data record.

20 Claims, 10 Drawing Sheets

(56) References Cited

U.S. PATENT DOCUMENTS

| | | | |
|---|---|---|---|
| 2023/0075884 A1 | 3/2023 | Jakobsson et al. | |
| 2023/0297702 A1 | 9/2023 | Fedorov et al. | |
| 2023/0342481 A1 * | 10/2023 | Nikoghossian | G06F 21/62 |
| 2025/0028852 A1 | 1/2025 | Chowanski | |
| 2025/0030547 A1 | 1/2025 | Chowanski | |
| 2025/0068646 A1 | 2/2025 | Rahman | |
| 2025/0077939 A1 | 3/2025 | Tabatabaei | |
| 2025/0086151 A1 | 3/2025 | Arora | |
| 2025/0104700 A1 | 3/2025 | Henault-Ethier | |
| 2025/0138838 A1 | 5/2025 | Ramesh et al. | |
| 2025/0139267 A1 | 5/2025 | Zykh et al. | |
| 2025/0173170 A1 | 5/2025 | Glynn-Udrow et al. | |
| 2025/0238410 A1 | 7/2025 | Arora et al. | |

* cited by examiner

300

TEMPLATES

TOKENIZATION RULE(S)    310

FIELD LEVEL DETAILS    312

COLUMN LEVEL DETAILS    314

FILE LEVEL DETAILS    316

DETOKENIZATION RULE(S)    320

COLUMN LEVEL DETAILS    322

FILE LEVEL DETAILS    324

FIELD LEVEL DETAILS    326

MAPPING(S)    330

COLUMN LEVEL DETAILS    332

FILE LEVEL DETAILS    334

EXAMPLE    500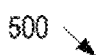

| USE CASE | DATA TYPE | TOKENIZATION TEMPLATE |
|---|---|---|
| ACCOUNT IDENTIFICATION | ACCOUNT ID | TOKENIZATION |
| CUSTOMER IDENTIFICATION | CUSTOMER NUMBER | TOKENIZATION |
| US ADDRESS REQUIREMENT | US APP - US ZIP CODE | TOKENIZATION |
| US ADDRESS REQUIREMENT | US APP - CAN POSTAL CODE | TOKENIZATION |
| CANADIAN ADDRESS REQUIREMENT | CAN APP - US ZIP CODE | MASKING - PARTIAL |
| CANADIAN ADDRESS REQUIREMENT | CAN APP - CAN POSTAL CODE | MASKING - PARTIAL |
| PII | DATE OF BIRTH | MASKING - FULL |
| PII | FIRST NAME | MASKING - FULL |
| PII | LAST NAME | MASKING - FULL |
| PII | TELEPHONE | MASKING - FULL |

FIG. 5

EXAMPLE                    600

| DATA SOURCE | DATA TYPE | ORIGINAL DATA ELEMENT | TOKENIZED DATA ELEMENT | TOKENIZATION PROCESS |
|---|---|---|---|---|
| SOURCE 1 | CAN APP - US ZIP CODE | 522001 | 522 | KEEP FIRST 3 CHARACTERS |
| SOURCE 1 | CAN APP - CAN POSTAL CODE | L1K1N1 | L1K | KEEP FIRST 3 CHARACTERS |
| SOURCE 2 | DATE OF BIRTH | 1981-06-19 | EMPTY VALUE | DELETE ORIGINAL VALUE / REPLACE WITH EMPTY VALUE |
| SOURCE 2 | FIRST NAME | JAMES | EMPTY VALUE | DELETE ORIGINAL VALUE / REPLACE WITH EMPTY VALUE |
| SOURCE 2 | LAST NAME | BOND | EMPTY VALUE | DELETE ORIGINAL VALUE / REPLACE WITH EMPTY VALUE |
| SOURCE 2 | TELEPHONE | 647-999-9999 | EMPTY VALUE | DELETE ORIGINAL VALUE / REPLACE WITH EMPTY VALUE |

FIG. 6

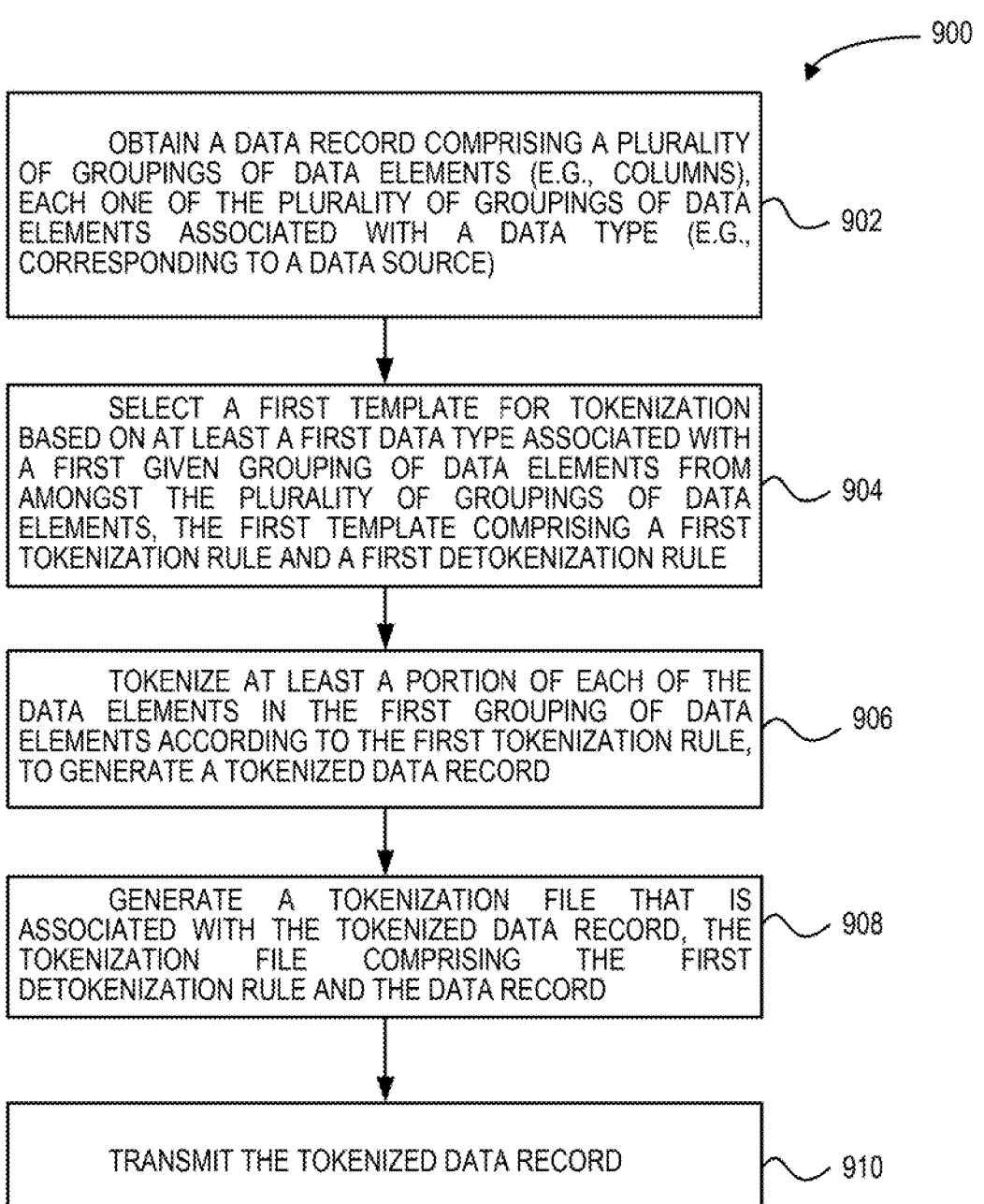

900

OBTAIN A DATA RECORD COMPRISING A PLURALITY OF GROUPINGS OF DATA ELEMENTS (E.G., COLUMNS), EACH ONE OF THE PLURALITY OF GROUPINGS OF DATA ELEMENTS ASSOCIATED WITH A DATA TYPE (E.G., CORRESPONDING TO A DATA SOURCE)    902

SELECT A FIRST TEMPLATE FOR TOKENIZATION BASED ON AT LEAST A FIRST DATA TYPE ASSOCIATED WITH A FIRST GIVEN GROUPING OF DATA ELEMENTS FROM AMONGST THE PLURALITY OF GROUPINGS OF DATA ELEMENTS, THE FIRST TEMPLATE COMPRISING A FIRST TOKENIZATION RULE AND A FIRST DETOKENIZATION RULE    904

TOKENIZE AT LEAST A PORTION OF EACH OF THE DATA ELEMENTS IN THE FIRST GROUPING OF DATA ELEMENTS ACCORDING TO THE FIRST TOKENIZATION RULE, TO GENERATE A TOKENIZED DATA RECORD    906

GENERATE A TOKENIZATION FILE THAT IS ASSOCIATED WITH THE TOKENIZED DATA RECORD, THE TOKENIZATION FILE COMPRISING THE FIRST DETOKENIZATION RULE AND THE DATA RECORD    908

TRANSMIT THE TOKENIZED DATA RECORD    910

FIG. 9

COMPUTING SYSTEMS AND METHODS FOR AUTOMATIC FILE TOKENIZATION

TECHNICAL FIELD

The disclosed exemplary embodiments relate to computer-implemented systems and methods for automatic file tokenization.

BACKGROUND

In some cases, computing systems store data that includes confidential information and it is desirable for other computing systems to interact with the data without revealing the confidential information. For example, the data with confidential information is sent to a third party, but the portions of the data that are confidential are desired to be hidden. Or, in some other cases, it is desirable to transfer data holding the confidential information without revealing the confidential information, and, only with the correct data access or data permission the confidential information is revealed.

However, processing the data to maintain confidentiality is challenging. In some cases, the data that includes confidential information is stored across a combination of newer computing architectures and databases and older computing architectures and databases (also called legacy data pipelines). Some of these computing architectures and databases, whether newer or older, are not configured to apply data masking and data obfuscation to confidential information. The older computing architectures and databases are more likely to be unequipped with data masking and data obfuscation capabilities. Providing data masking and data obfuscation, and data mechanisms to unmask and reverse the obfuscation, is made more challenging with the different types computing architectures and databases.

Furthermore, in some cases existing computing architectures and databases do not identify which data or portions of data are confidential. It is further recognized that the criteria for classifying data types as confidential may change over time. For example, a given type of data during a previous time period is not considered confidential, and during a current time period the same given type of data is now considered confidential (or vice versa).

SUMMARY

The following summary is intended to introduce the reader to various aspects of the detailed description, but not to define or delimit any invention.

In at least one broad aspect, a system for processing input data is provided. The system comprising: a memory, a communication interface, and a processor operatively coupled to the memory and the communication interface; and an application stored in the memory and executable by the processor. The processor is configured to execute the application to at least:

obtain a data record comprising a plurality of groupings of data elements, each one of the plurality of groupings of data elements associated with a data type;

select a first template for tokenization based on at least a first data type associated with a first given grouping of data elements from amongst the plurality of groupings of data elements, the first template comprising a first tokenization rule and a first detokenization rule;

tokenize at least a portion of each of the data elements in the first grouping of data elements according to the first tokenization rule, to generate a tokenized data record;

generate a tokenization file that is associated with the tokenized data record, the tokenization file comprising the first detokenization rule and the data record; and transmit the tokenized data record.

In some cases, the data record comprises a plurality of rows and a plurality of columns, and the plurality of groupings of data elements comprises a plurality of columns.

In some cases, the processor is further configured to: select a second template for tokenization based on at least a second data type associated with a second given grouping of data elements from amongst the plurality of groupings of data elements, the second template comprising a second tokenization rule and a second detokenization rule; tokenize a portion of each of the data elements in the second grouping of data elements according to the second tokenization rule, to further generate the tokenized data record; add to the tokenization file the second detokenization rule; and wherein the second tokenization rule is different from the first tokenization rule, and the second detokenization rule is different from the second detokenization rule.

In some cases, the application receives a plurality of data records, including the data record, from a plurality of different data sources, and wherein the processor is further configured to generate a plurality of tokenized data records corresponding respectively to the plurality of data records, and output the plurality of tokenized data records to a plurality of different client devices.

In some cases, the plurality of different data sources operate on at least two or more different operating systems.

In some cases, the processor is further configured to: mask an ancillary portion of each of the data elements in the first grouping of data elements according to a first masking rule in the first template, and store a first demasking rule in the tokenization file.

In some cases, the data record comprises a plurality of rows and a plurality of columns, a given column comprises to the first given grouping of data elements and the first given grouping of data elements are respectively assigned a plurality of original row IDs. The processor is further configured to: generate a plurality of unique IDs in a new unique ID column assigned to each data element in the first given grouping of data elements and to each of the plurality of original row IDs; sort the plurality of rows according to the plurality of unique IDs to generate a new ordering of the plurality of rows, and assign a plurality of new row IDs in a new row ID column according to the new ordering of the plurality of rows; and replace the first given grouping of data elements with a plurality of incremental token values based on the new ordering of the plurality of rows. The plurality of incremental token values and the plurality of new row IDs form at least part of the first tokenized record.

In some cases, the processor is further configured to: identify that a second given grouping of data elements, from amongst the plurality of groupings of data elements, satisfies one or more criteria for erasure; and replace each of the data elements in the second given grouping of data elements with an empty string.

In some cases, the tokenization file is unchanged by replacing each of the data elements in the second given grouping of data elements with the empty string.

In some cases, the data type corresponds to a data source.

In at least one broad aspect, a method for processing input data is provided. The method is executed in a computing environment comprising one or more processors and memory, wherein the memory stores at least an application. The method comprising:

obtaining a data record comprising a plurality of group-
ings of data elements, each one of the plurality of
groupings of data elements associated with a data type;
selecting a first template for tokenization based on at least
a first data type associated with a first given grouping
of data elements from amongst the plurality of group-
ings of data elements, the first template comprising a
first tokenization rule and a first detokenization rule;
tokenizing at least a portion of each of the data elements
in the first grouping of data elements according to the
first tokenization rule, to generate a tokenized data
record;
generating a tokenization file that is associated with the
tokenized data record, the tokenization file comprising
the first detokenization rule and the data record; and,
transmitting the tokenized data record.

In some cases, the data record comprises a plurality of
rows and a plurality of columns, and the plurality of group-
ings of data elements comprises a plurality of columns.

In some cases, the method further comprises: selecting a
second template for tokenization based on at least a second
data type associated with a second given grouping of data
elements from amongst the plurality of groupings of data
elements, the second template comprising a second tokeni-
zation rule and a second detokenization rule; tokenizing a
portion of each of the data elements in the second grouping
of data elements according to the second tokenization rule,
to further generate the tokenized data record; adding to the
tokenization file the second detokenization rule; and wherein
the second tokenization rule is different from the first
tokenization rule, and the second detokenization rule is
different from the second detokenization rule.

In some cases, the application receives a plurality of data
records, including the data record, from a plurality of
different data sources, and wherein the processor is further
configured to generate a plurality of tokenized data records
corresponding respectively to the plurality of data records,
and output the plurality of tokenized data records to a
plurality of different client devices.

In some cases, the plurality of different data sources
operate on at least two or more different operating systems.

In some cases, the method further comprises: masking an
ancillary portion of each of the data elements in the first
grouping of data elements according to a first masking rule
in the first template, and storing a first demasking rule in the
tokenization file.

In some cases, the data record comprises a plurality of
rows and a plurality of columns, a given column comprises
to the first given grouping of data elements and the first
given grouping of data elements are respectively assigned a
plurality of original row IDs. The method further comprises:
generating a plurality of unique IDs in a new unique ID
column assigned to each data element in the first given
grouping of data elements and to each of the plurality of
original row IDs; sorting the plurality of rows according to
the plurality of unique IDs to generate a new ordering of the
plurality of rows, and assign a plurality of new row IDs in
a new row ID column according to the new ordering of the
plurality of rows; replacing the first given grouping of data
elements with a plurality of incremental token values based
on the new ordering of the plurality of rows; and, wherein
the plurality of incremental token values and the plurality of
new row IDs form at least part of the first tokenized record.

In some cases, the method further comprises: identifying
that a second given grouping of data elements, from amongst
the plurality of groupings of data elements, satisfies one or more criteria for erasure; and replacing each of the data
elements in the second given grouping of data elements with
an empty string.

In some cases, the tokenization file is unchanged by
replacing each of the data elements in the second given
grouping of data elements with the empty string.

According to some aspects, the present disclosure pro-
vides a non-transitory computer-readable medium storing
computer-executable instructions. The computer-executable
instructions, when executed, configure a processor to per-
form any of the methods described herein.

BRIEF DESCRIPTION OF THE DRAWINGS

The drawings included herewith are for illustrating vari-
ous examples of articles, methods, and systems of the
present specification and are not intended to limit the scope
of what is taught in any way. In the drawings:

FIG. 5 is an example of data components stored in a
templates module, mapping example data types to example
templates, in accordance with at least some embodiments;

FIG. 6 is an example of data components showing a data
type, an original data element, a tokenized data element, and
a corresponding tokenization process, in accordance with at
least some embodiments;

FIG. 9 is a flowchart diagram of an example method of
automatically tokenizing a data record, in accordance with at
least some embodiments.

DETAILED DESCRIPTION

Figure 1A:
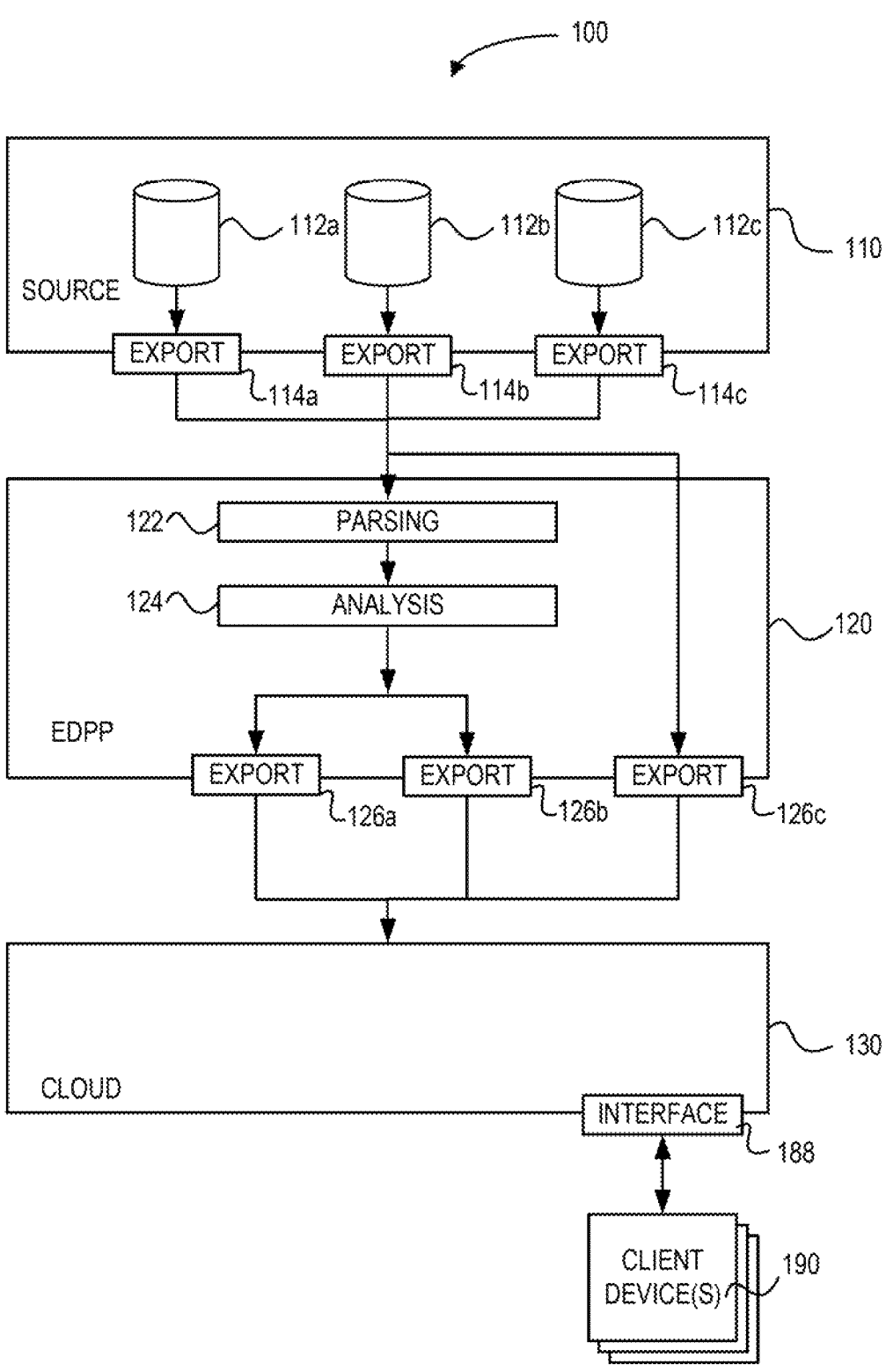
FIG. 1A is a schematic block diagram of a system for
processing application requests in accordance with at least
some embodiments.

In some cases, it is desirable to obfuscate, mask or
withhold confidential information. Doing so from various
databases from different computing platforms and different
computing architectures is challenging. It is also challenging
to then distribute the obfuscated and/or masked data to
various other client devices, which may also have different
operating systems.

Furthermore, in some cases, only certain data types and
portions of the data in a data record are confidential, while
other data in the same data record are not confidential. In
some cases, it is desirable to automatically recognize the
confidential portions and tokenize those portions.

In some cases, a file tokenization application is provided that obtains a data record, such as a table, comprising a plurality of groupings of data elements. Each one of the plurality of groupings of data elements associated with a data type. The file tokenization application selects a first template for tokenization based on at least a first data type associated with a first given grouping of data elements from amongst the plurality of groupings of data elements. The first template comprises a first tokenization rule and a first detokenization rule. The file tokenization application tokenizes at least a portion of each of the data elements in the first grouping of data elements according to the first tokenization rule, to generate a tokenized data record. It then generates a tokenization file that is associated with the tokenized data record. The tokenization file comprises the first detokenization rule and the data record. The file tokenization application then transmits the tokenized data record (such as to a third party).

In some cases, a computing system includes a file tokenization application (also called file tokenization tool) to automatically identify confidential data, automatically mask or obfuscate the confidential data, and tokenize the files. The tokenization of the files is used for tracking the masking and/or obfuscation and, optionally, reversing the masking and/or obfuscation.

In some cases, the file tokenization application is configured to process data files across newer and older computing architectures and databases. The file tokenization application is also configured to operate with different devices, including desktop workstation computers, laptops, and server systems. The file tokenization application is configured to interact with file systems across different computing platforms, including but not limited to Windows, Azure and Linux.

In some cases, the file tokenization application obtains a data record, such as a table, comprising a plurality of groupings of data elements (e.g., columns). Each one of the plurality of groupings of data elements associated with a data type. In some cases, the data type corresponding to a data source.

In some cases, the file tokenization application stores thereon different templates for tokenization, and will select a template appropriate to the data type of a given grouping of data. For example, the file tokenization application selects a first template for tokenization based on at least a first data type associated with a first given grouping of data elements from amongst the plurality of groupings of data elements. The first template comprises a first tokenization rule and a first detokenization rule.

In some cases, the file tokenization application tokenizes at least a portion of each of the data elements in the first grouping of data elements according to the first tokenization rule, to generate a tokenized data record. It then generates a tokenization file that is associated with the tokenized data record. The tokenization file comprises the first detokenization rule and the data record. The file tokenization application then transmits the tokenized data record (such as to a third party), and stores the tokenization file for its records to later on detokenize the data.

Referring now to FIG. 1A, there is illustrated a block diagram of an example computing system, in accordance with at least some embodiments. Computing system 100 has a source database system 110, an enterprise data provisioning platform (EDPP) 120 operatively coupled to the source database system 110, and a cloud-based computing cluster 130 that is operatively coupled to the EDPP 120. In some cases. this computing system 100 is provided for automated data processing of large data sets, including computing a time series of predicted characteristics of assets identified within the large data sets.

Source database system 110 has one or more databases, of which three are shown for illustrative purposes: database 112a, database 112b and database 112c. One or more the databases of the source database system 110 may contain confidential information that is subject to restrictions on export. One or more export modules 114a, 114b, 114c may periodically (e.g., daily, weekly, monthly, etc.) export data from the databases 112a, 112b, 112c to EDPP 120. In some instances, the data is exported on an ad hoc basis. In some cases, the export data may be exported in the form of comma separated value (CSV) data, however other formats may also be used.

EDPP 120 receives source data exported by the export modules 114 of source database system 110, processes it and exports the processed data to an application database within the cloud-based computing cluster 130. For example, a parsing module 122 of EDPP 120 may perform extract, transform and load (ETL) operations on the received source data.

In many environments, access to the EDPP may be restricted to relatively few users, such as administrative users. However, with appropriate access permissions, data relevant to an application or group of applications (e.g., a client application) may be exported via reporting and analysis module 124 or an export module 126. In particular, parsed data can then be processed and transmitted to the cloud-based computing cluster 130 by a reporting and analysis module 124. Alternatively, one or more export modules 126a, 126b, 126c can export the parsed data to the cloud-based computing cluster 130.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of personal identifiable information (PII) in the confidential data. Moreover, such "on-premises" systems typically are designed with access controls to limit access to the data, and thus may not be resourced or otherwise suitable for use in broader dissemination of the data. In some cases, to comply with such restrictions, one or more module of EDPP 120 may "de-risk" data tables that contain confidential data prior to transmission to cloud-based computing cluster 130. In some cases, this de-risking process may obfuscate or mask elements of confidential data, or may exclude certain elements, depending on the specific restrictions applicable to the confidential data. The specific type of obfuscation, masking or other processing is referred to as a "data treatment."

The cloud-based computing cluster 130 includes an interface 188, which facilitates data communication with one or more client devices.

Figure 1B:
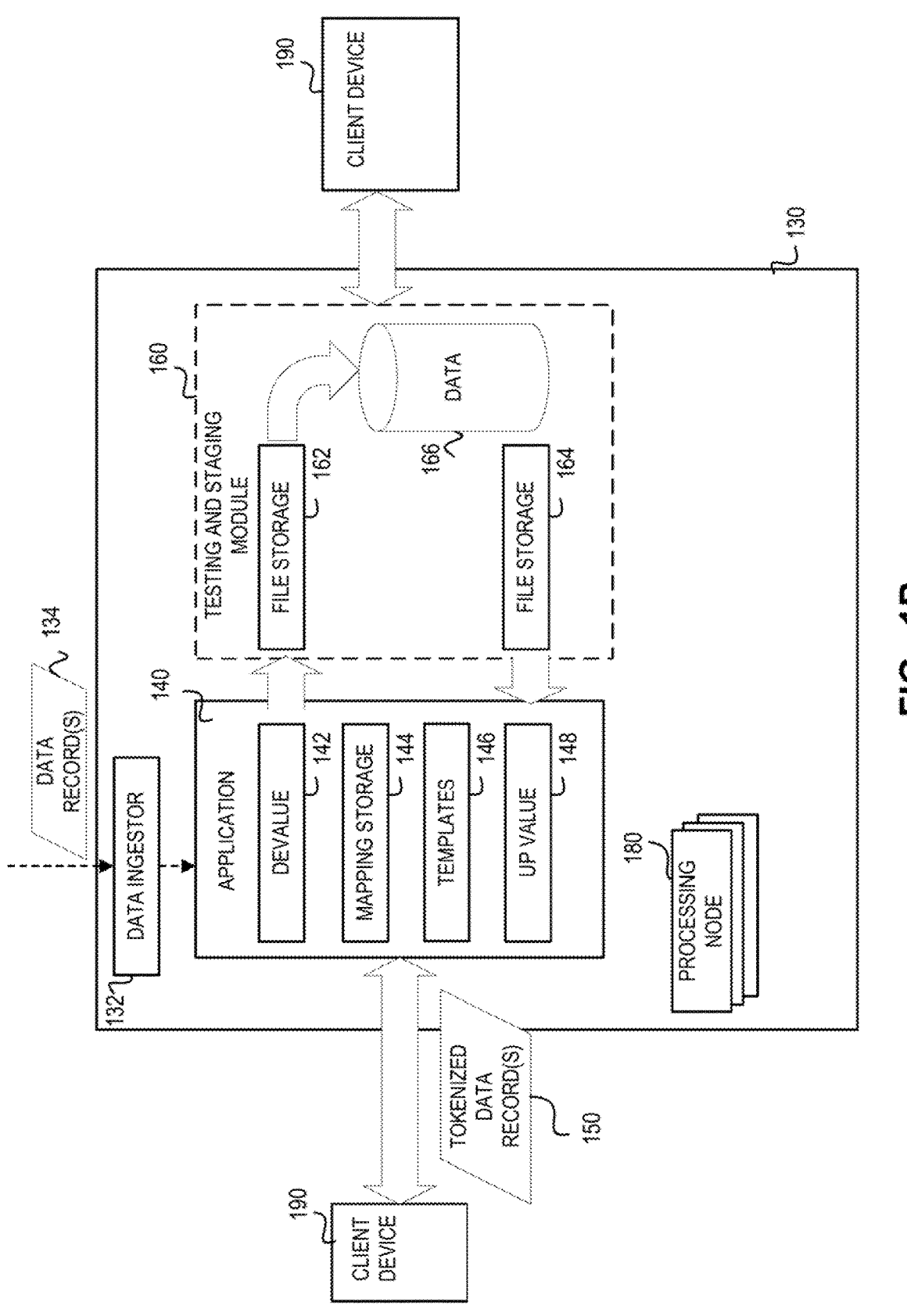
FIG. 1B is a schematic block diagram of a cloud-based
computing cluster of FIG. 1A, including an application
configured to process input data for automatic file tokeni-
zation, in accordance with at least some embodiments.

Referring now to FIG. 1B, there is illustrated a block diagram of the cloud-based computing cluster 130, showing greater detail of the elements of the cloud-based computing cluster, which may be implemented by computing nodes of the cluster that are operatively coupled.

The components of the cloud-based computing cluster 130 include a data ingestor 132, an application 140 for file tokenization, and a testing and staging module 160 are implemented as one or more processing nodes 180 in the cloud-based computing cluster. In some cases, these components are implemented as virtual machines within the cloud-based computing cluster. The application 140 is also herein called a file tokenization application.

In some cases, data (e.g., files with data records 134) is obtained by the data ingestor 132 and is transmitted to the application 140. In some cases, different data records originate from different data sources (e.g., databases 112*a*, 112*b*, 112*c*). In some cases, the data records 134 include confidential data or data that is considered Personal Identifiable Information (PII), or both. In some cases, a data record includes a plurality of rows and a plurality of columns, and the plurality of groupings of data elements are a plurality of columns. For example, the data record is in a table format.

In some cases, the application 140 receives a plurality of data records, from a plurality of different data sources. The application generates a plurality of tokenized data records corresponding respectively to the plurality of data records, and outputs the plurality of tokenized data records to a plurality of different client devices 190. In some cases, the plurality of different data sources operate on at least two or more different operating systems.

In some cases, the application 140 includes a devalue module 142, a mapping storage module 144, a templates module 146 and an up value module 148. In some cases, the devalue module 142 is used to produce one or more tokenized data records and to produce one or more tokenization files. In some cases, a tokenization file is associated with a tokenized data record, and includes the tokenization file includes a detokenization rule (e.g., obtained from a templates module) or a data record (e.g., that was used to create the tokenized data record), or both. In some cases, the mapping storage model 144 is used to store the one or more tokenization files. In some cases, the templates module 146 is used to store a variety of tokenization rules and corresponding detokenization rules, and which are mapped to different data types. In some cases, a grouping of data elements in a given data record are associated with a data type that is found in the templates module 146, and the application 140 is configured to automatically select a given template from the templates module to apply to the given grouping of data elements in the given data record. In some cases, more that one grouping of data elements in a given data records is tokenized. Different data groups can be tokenized using different tokenization computations. In some cases, the up value module 148 is used to detokenize a tokenized data record. In some cases, the application 140, via the up value module 148, obtains (e.g., from the mapping storage module 144) and relies on the tokenization file corresponding to the tokenized data record to obtain the data record that was used to create the tokenized data record.

In some cases, one or more tokenized data records 150 are transmitted to an external computing device, such as a client device 190.

In some cases, the application 140 is in data communication with a testing and staging module 160. The testing and staging module 160 includes a file storage 162, a database 166 used for testing and staging, and an additional file storage 164 that stores results of the testing and staging. In some cases, the application 140 will transmit tokenized data records to the testing and staging module 160, and the testing and staging module 160 automatically tests the tokenized data records within the staging environment of these testing and staging module 160. The tests, for example, may vary according to different privacy and security considerations according to one or more data types. The tests, for example, may also vary according to application-specific considerations. The results of the testing are then returned to the application 140. In some cases, the application 140 uses the results to examine if the testing was successful. In some cases, the examining of the results includes the application 140 detokenizing the results and examining the detokenized results. In some cases, after the results have been examined by the application 140 and the results are determined to be accurate (or passed) by the application 140, then the tokenized data records 150 are sent to one or more client device 190. In other cases, there is no testing and staging module 160, nor associated processes for testing and staging.

In some cases, data ingestor 132, the application 140 and the testing and staging module 160 reside and operate in the organization's computing environment. For example, the data ingestor 132, the application 140 and the testing and staging module 160 reside in a private cloud-based computer cluster. In another example, the data ingestor 132, the application 140 and the testing and staging module 160 reside on-premise on the organization's computing environment.

It will be appreciated that, while the components shown in FIG. 1B for the cloud-based computing cluster 130 can be implemented with the system 100 in FIG. 1A, in some other cases, the components shown in FIG. 1B are instead implemented in an isolated computing server system. In other words, the components shown in FIG. 1B can be implemented as one or more processing nodes 180 without the EDPP 120 and the source database system 110.

Figure 2:
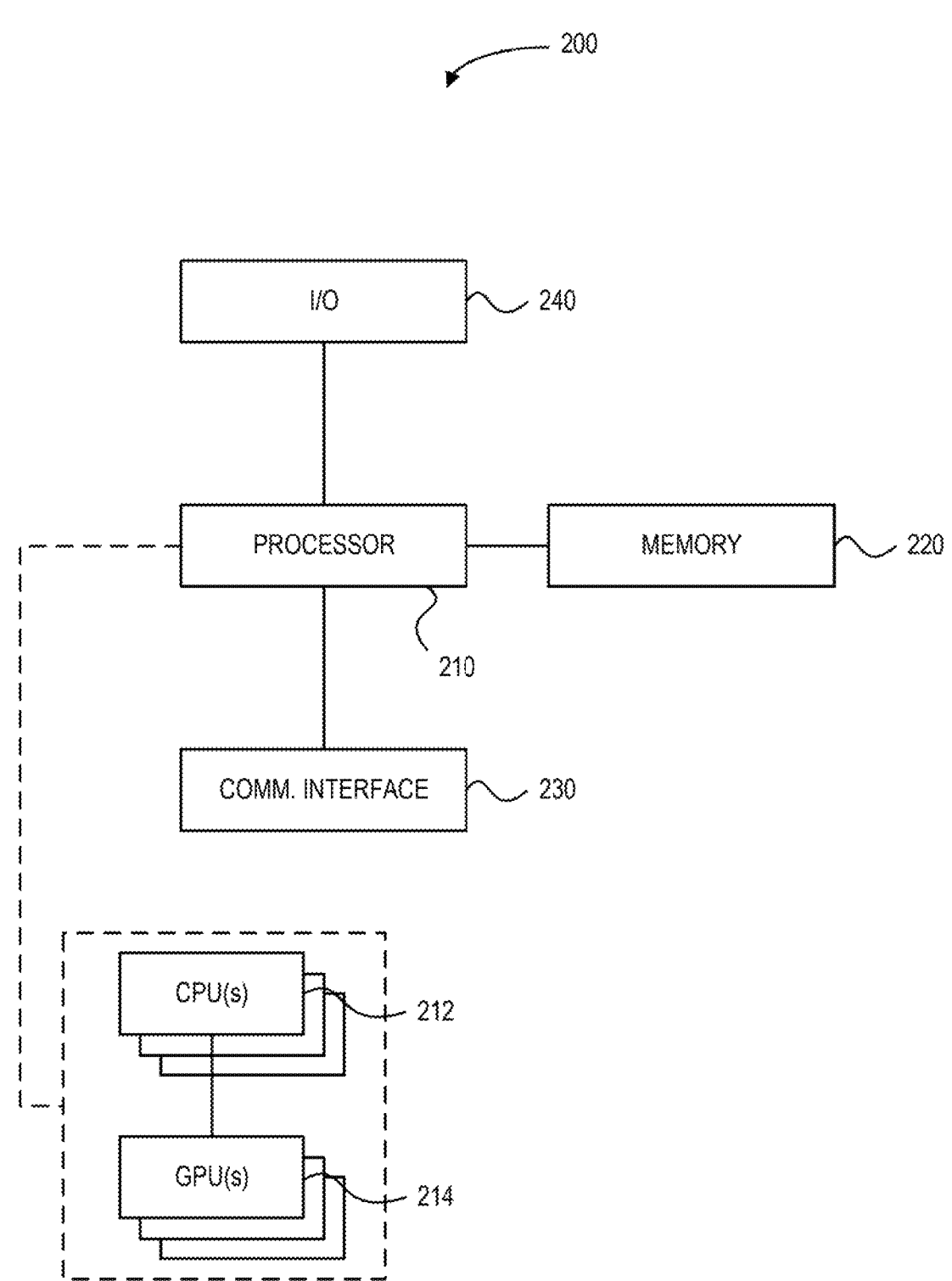
FIG. 2 is a block diagram of a computer in accordance
with at least some embodiments.

Referring now to FIG. 2, there is illustrated a simplified block diagram of a computer in accordance with at least some embodiments. Computer 200 is an example implementation of a computer such as source database system 110, EDPP 120, processing node 180 of FIGS. 1A and 1B. Computer 200 has at least one processor 210 operatively coupled to at least one memory 220, at least one communications interface 230 (also herein called a network interface), and at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some cases, the processor 210 includes a system of central processing units (CPUs) 212. In some other cases, the processor includes a system of one or more CPUs and one or more Graphical Processing Units (GPUs) 214 that are coupled together.

Figure 3:
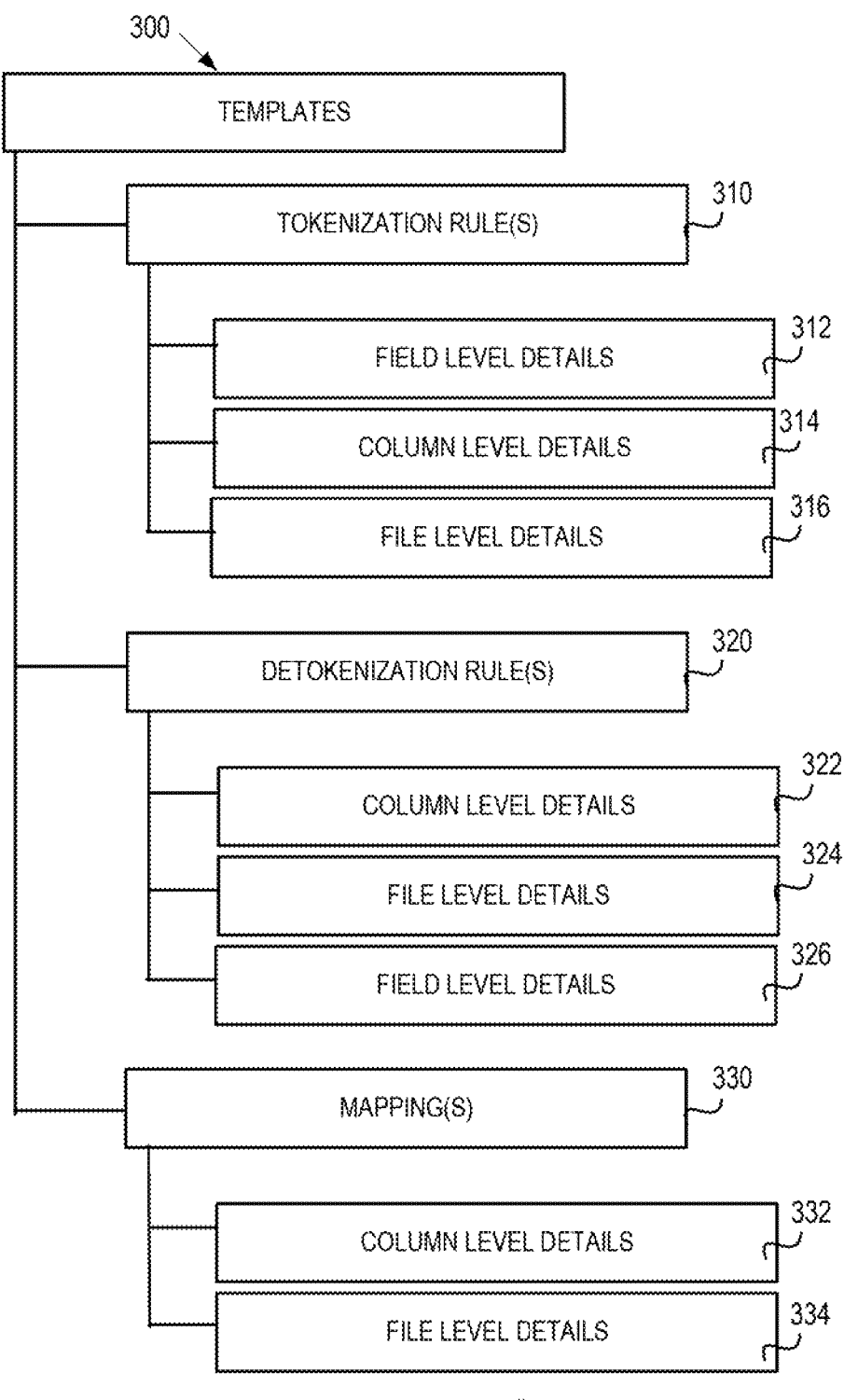
FIG. 3 is a schematic block diagram of a template and its
data components in accordance with at least some embodi-
ments.

Referring now to FIG. 3, an example embodiment of a template data architecture is shown. In some cases, a given template 300 includes into a set of data that includes one or more tokenization rules 310 and one or more detokenization rules 320. In some cases, the set of data in the given template 300 also includes one or more mappings 330 that maps the given template (and its one or more tokenization rules and one or more detokenization rules) to a certain data type.

In some cases, a mapping 330 includes details 332 about a column of data (or more generally a grouping of data elements) in a data record. For example, the organization of a column of data is applicable in some cases in which different data types in a data record are grouped by columns. The mapping 330 also includes detail 334 about a file (or more generally a data source) associated with a data record. In some cases, the details 332 about a grouping of data elements include a data type and the details 334 about a corresponding data source are both used by the application 140 to automatically identify and select a template from the templates module 146.

Continuing with FIG. 3, in some cases, a tokenization rule 310 includes field level details 312 related to each data element, or column level details 314 (or more generally details about a group of data elements), or file level details 316 (or more generally details about the overall file containing the data record, such as a data source of the data record), or a combination thereof. These details include executable instructions to tokenize data, which may include obfuscating, masking or deleting data.

In some cases, a detokenization rule 320 includes field level details 326 related to each data element, or column level details 322 (or more generally details about a group of data elements), or file level details 324 (or more generally details about the overall file containing the data record, such as a data source of the data record), or a combination thereof. These details include executable instructions to detokenize data.

In some cases, the templates are in fixed format. The values are configurable without changes to the application 140.

In some cases, all templates in the templates module 146 are be consolidated in a .csv file and separated by processes.

In some cases, data from all the processes will be captured in one .csv file.

In some cases, these template file details for these different processes are stored as separate files.

Figure 4:
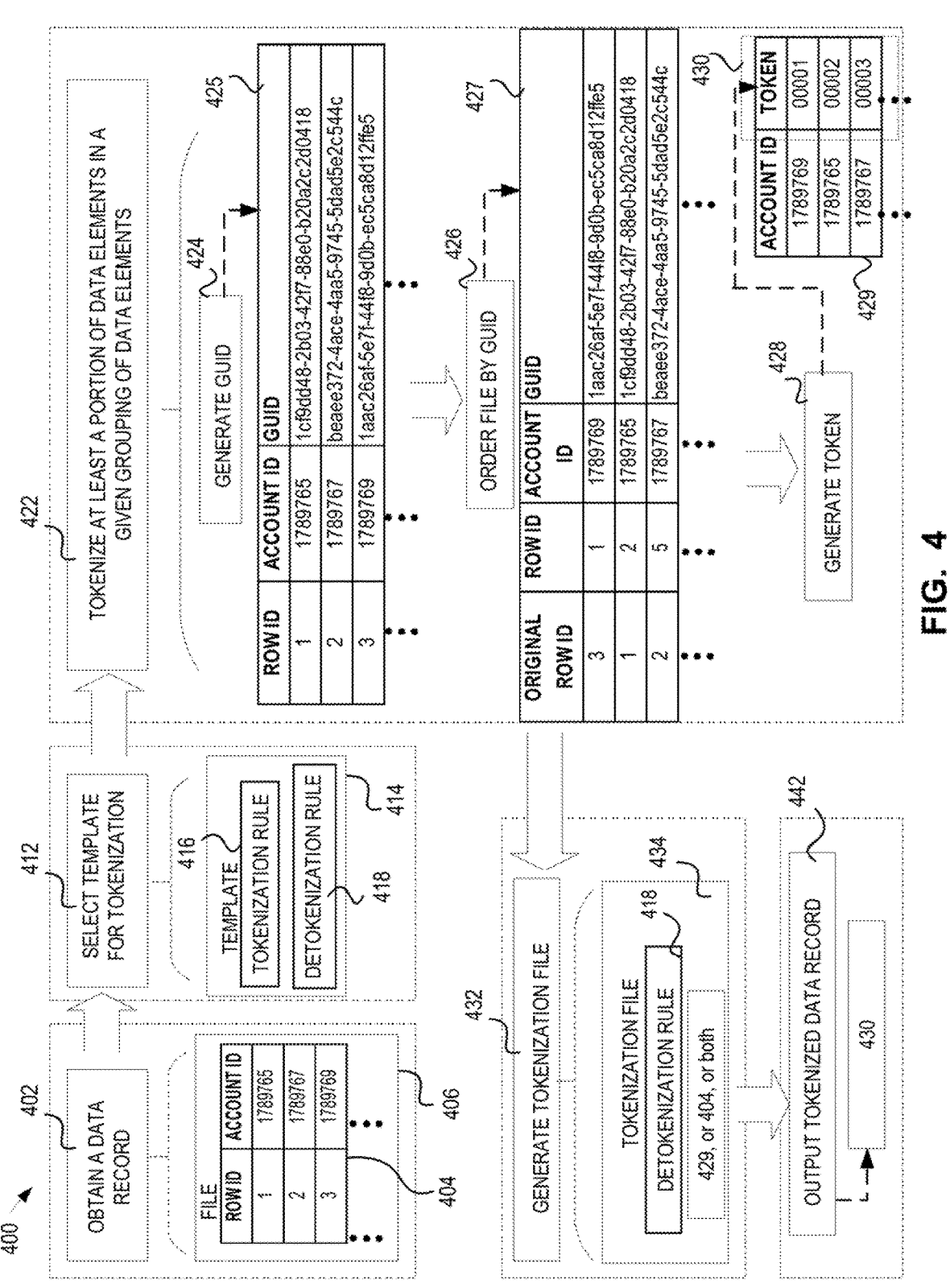
FIG. 4 is a flow diagram of a process for automatically
tokenizing a data record, including example data compo-
nents, in accordance with at least some embodiments.

Referring now to FIG. 4, an example tokenization process 400 is provided. The data record and the tokenization computation shown in FIG. 4 are just for example and it will be appreciated that other types of data and other tokenization computations could be used. The example tokenization process 400 includes obtaining a data record (block 402), selecting a template for tokenization (block 412), tokenizing at least a portion of the data elements in a given grouping of data elements (block 422) which produces a tokenized data record 430, generating a tokenization file (block 432), and outputting a tokenized record block (block 442).

In relation to block 402, an example data record 404 is part of a data file 406. The data record 404 includes two groupings of data elements, in this case, a grouping of data elements arranged in a column under a row ID heading and another grouping of data elements arranged in another column under an account ID heading. For example, the row ID heading is a first data type and the account ID heading is a second data type. In some cases, the data type, such as the account ID heading, is associated with a data source.

In relation to block 412, an example template 414, which has been selected based on the account ID heading (e.g., a data type associated with a given group of data elements from the data record 404), includes a tokenization rule 416 and a detokenization rule 418.

In relation to block 422, example tokenization process operations include generating a globally unique identifier (GUID) data element for each row in the data record 404 (block 424), ordering the data record rows by the GUID data elements (block 426), and generating a token for each row in the data record (block 428), which provides a tokenized data record 430. These operations, in some cases, are stored as executable instructions in the tokenization rule 416. An example intermediate data record 425 shows the generated GUID data elements, and another example intermediate data record 427 shows the rows reorganized according to the GUID data elements, which further includes the new row ID mapped to the original row ID. Another version of a data record 429 is shown that includes a mapping of the account ID data elements and the corresponding tokens, and the tokens correspond to the GUID data elements that have been renumbered. The example of the tokenized data record 430 includes a listing of the account ID data elements and a listing of token values that are respectively associated with the listing of account ID data elements. The listing of token values forms the example tokenized data record 430.

In some cases, the tokenization process is also described as follows. The data record includes a plurality of rows and a plurality of columns. A given column includes a first given grouping of data elements (e.g., account ID data elements) and the first given grouping of data elements are respectively assigned a plurality of original row IDs. The application 140 generates a plurality of unique IDs (e.g., the GUIDs) in a new unique ID column assigned to each data element in the first given grouping of data elements and to each of the plurality of original row IDs. The application 140 sorts the plurality of rows according to the plurality of unique IDs to generate a new ordering of the plurality of rows, and assigns a plurality of new row IDs in a new row ID column according to the new ordering of the plurality of rows. The application 140 replaces the first given grouping of data elements with a plurality of incremental token values based on the new ordering of the plurality of rows. In some cases, the plurality of incremental token values and the plurality of new row IDs form at least part of the first tokenized record.

In relation to block 432, an example tokenization file 434 that is generated by the application 140 includes the detokenization rule 418 or the data record 404 or the version of the data record 429, or a combination thereof. More generally, there is sufficient information in the tokenization file, in combination with the tokenized data record, to obtain or regenerate data elements that have been tokenized or obfuscated or masked or deleted from the data record 404.

In relation to block 442, the example tokenized data record 430 is shown.

In some other cases, the process further includes tokenizing a second grouping of data elements in the same data record. For example, the application 140 selects a second template for tokenization based on at least a second data type associated with the second grouping of data elements from amongst the plurality of groupings of data elements, and the second template includes a second tokenization rule and a second detokenization rule. The application 140 tokenizes a portion of each of the data elements in the second grouping of data elements according to the second tokenization rule, to further generate the tokenized data record. The application adds to the tokenization file the second detokenization rule. The second tokenization rule is different from the tokenization rule 416, and the second detokenization rule is different from the second detokenization rule 418.

Referring now to FIG. 5, an example listing of tokenization templates 500 is provided that are mapped to different data types. In some cases, there are three or more tokenization templates stored in the templates module 146, include a tokenization template, a masking-partial template, and a masking-full template. The tokenization template, for example, includes executable instructions similar to the process in blocks 424, 426 and 428. In some cases, different data types can use the same tokenization template, or a same type of tokenization template. For example, in FIG. 5, the data types account UD, customer number, US application—US ZIP code, and US application—Canadian postal code, use a tokenization template. In some other cases, other data types can use a masking-partial template, in which a portion of each data element in a given grouping is masked, obfuscated or deleted. In some other cases, other data types can use a masking-full template, in which the entirety of each data element in a given grouping is masked, obfuscated or deleted.

Referring now to FIG. 6, an example table of tokenized data elements 600 is shown. For a zip code in the US, the tokenized data element are the first three characters of the zip code and the other characters in the zip code are deleted or masked.

In some cases, the application 140 (via a computing system) masks an ancillary portion of each of the data elements in a grouping of data elements according to a masking rule in a template, and stores a demasking rule in the tokenization file. In some cases, the masking rule and the demasking rule are in addition to a tokenization rule and a detokenization rule. In some other cases, the masking rule and the demasking rule are in used and stored in place of a tokenization rule and a detokenization rule.

For a date of birth, the tokenized data element is an empty value as the tokenization process includes deleting the original value (i.e., the date of birth) or replacing the same with an empty value. For example, the empty value is an empty string.

In some cases, the application 140 identifies that a second given grouping of data elements, from amongst the plurality of groupings of data elements in a data record, satisfies one or more criteria for erasure. For example, the date of birth satisfies one or more criteria for erasure. The application 140 then replaces each of the data elements in the second given grouping of data elements with an empty string. In some cases, the tokenization file is unchanged by replacing each of the data elements in the second given grouping of data elements with the empty string.

In some other cases, other types of data could be replaced with an empty value include name information and phone number information.

Figure 7:
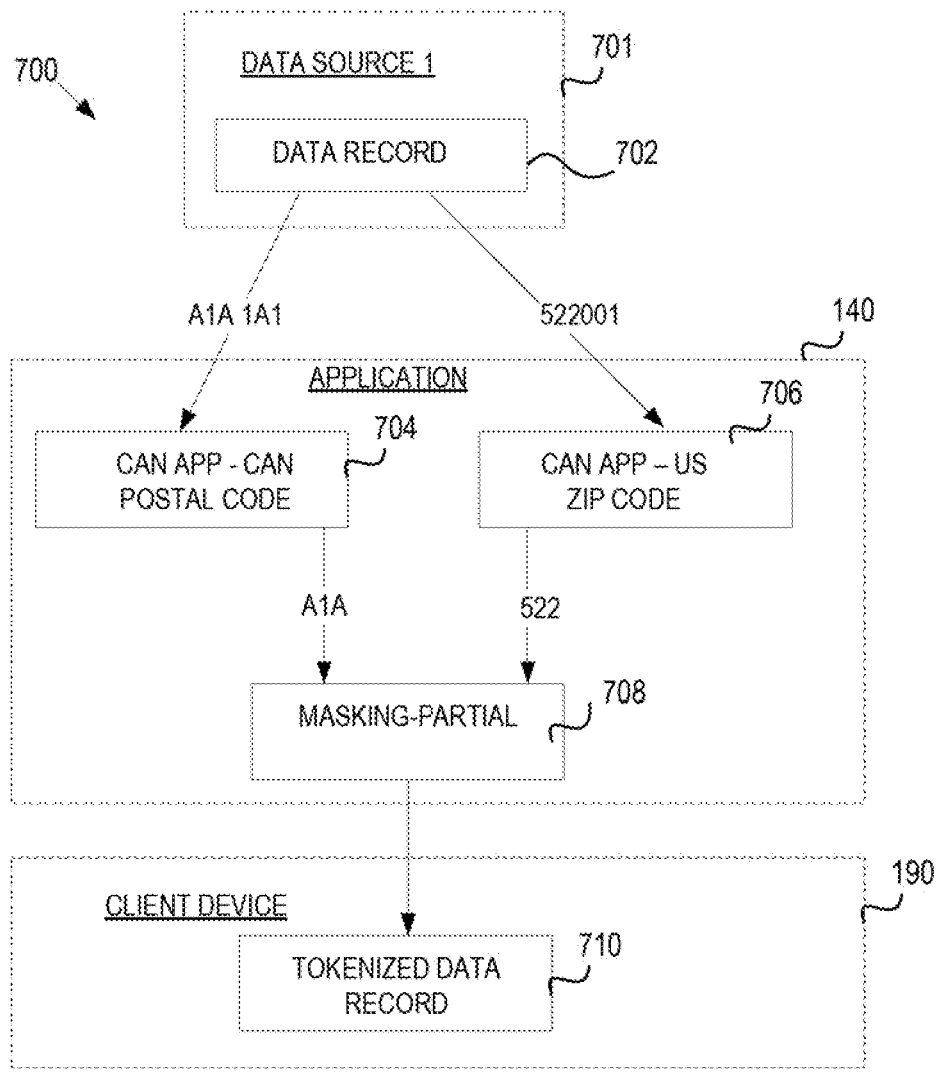
FIG. 7 is a flowchart diagram of an example method of
processing an input data record using partial masking of
some of a portion of each data element in a given grouping
of data elements, in accordance with at least some embodi-
ments.

Referring to FIG. 7, an example tokenization process is shown that includes a data source 701 providing a data record 702. The application 140 receives the data record. In some cases in which the data record includes a data type for a Canadian application—Canadian postal code 704, or a data type for a Canadian application—US zip code 706, then a masking-partial template 708 is used in which the first three characters of the postal code or zip code are only retained from each postal code or zip code. The retained first three characters are stored into a tokenized data record 710 sent to the client device 190.

Figure 8:
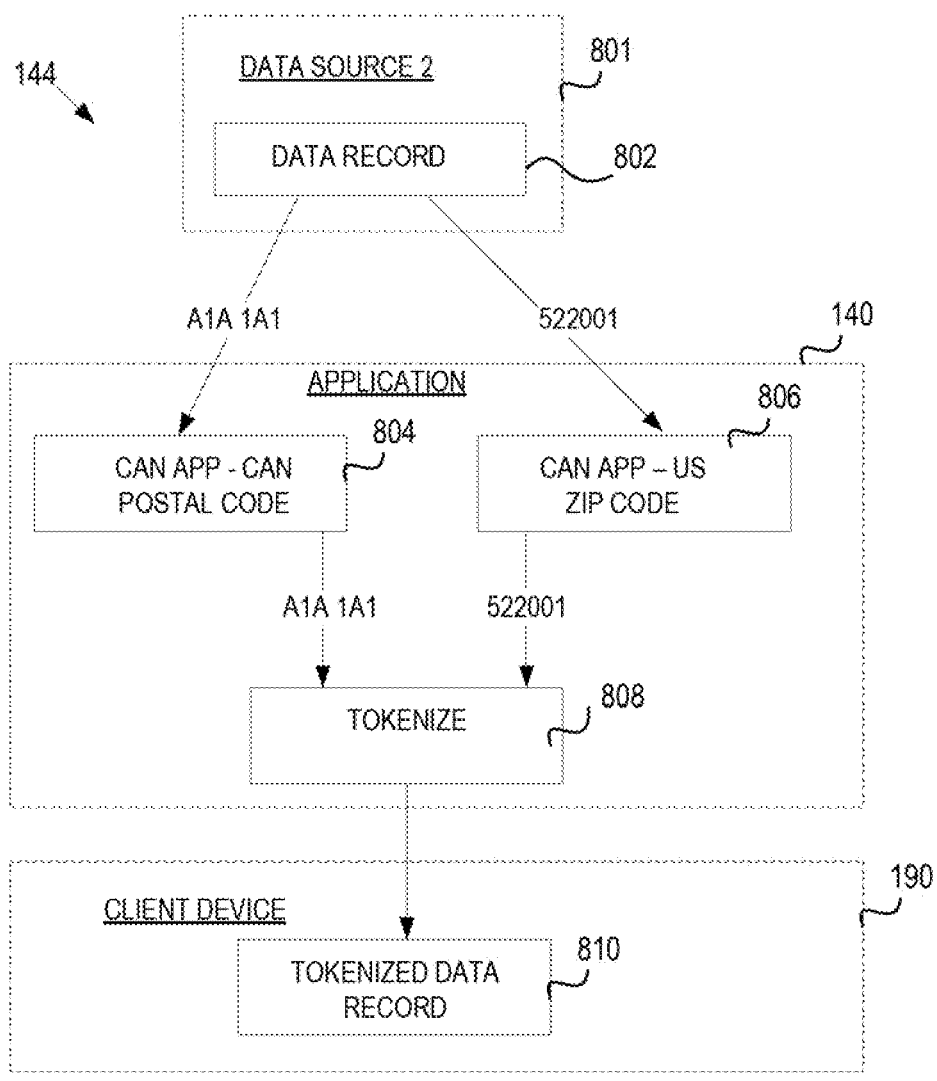
FIG. 8 is a flowchart diagram of an example method of
processing an input data record using tokenization of each
data element in a given grouping of data elements, in
accordance with at least some embodiments.

Referring to FIG. 8, an example tokenization process is shown that includes a different data source 801 providing a data record 802. The application 140 receives the data record 802. In some cases in which the data record includes a data type for a US application—Canadian postal code 804, or a data type for a US application—US zip code 806, then a tokenization template 808 is used, which can be similar to blocks 424, 426 and 428. The tokenized data record 810 sent to the client device 190.

Different Types of Tokenization

Below are additional details regarding tokenization. In some cases, the file tokenization application provides key mapping for an initial one-time database migration or periodic database masking. Each application team needs to write queries to use mapping to tokenize the database (i.e., key updates).

In some cases, the application 140 supports below types of tokenization: GUID; Surrogate Key (e.g., similar to database Identity column); postal code and zip code (e.g., first 3, or tokenize with retain format); and empty string (e.g., empty the specific data column).

GUID

In some cases, a GUID is a 128-bit integer (16 bytes) that can be used across all computers and networks wherever a unique identifier is required. Such an identifier has a very low probability of being duplicated.

An example of a GUID is "0f8fad5b-d9cb-469f-a165-70867728950e". In some cases, the length of GUID is 36 characters.

The length of GUID depends on how it is formatted. Below are examples.

NewGuid( ).ToString( )=>36 characters (Hyphenated), which outputs: 12345678-1234-1234-1234-123456789abc.

NewGuid( ).ToString("D")=>36 characters (Hyphenated, same as ToString( )), which outputs: 12345678-1234-1234-1234-123456789abc.

NewGuid( ).ToString("N")=>32 characters (Digits only), which outputs: 12345678123412341234123456789abc.

NewGuid( ).ToString("B")=>38 characters (Braces), which outputs: {12345678-1234-1234-1234-123456789abc}.

NewGuid( ).ToString("P")=>38 characters (Parentheses), which outputs: (12345678-1234-1234-1234-123456789abc).

NewGuid( ).ToString("X")=>68 characters (Hexadecimal), which outputs: 0x12345678,0x1234,0x1234, {0x12,0x34, 0x12,0x34,0x56,0x78,0x9a,0xbc}}.

Surrogate Key/Incremental Tokenization

Surrogate Key Tokenization

In some cases, data coming from a source system will be ordered after assigning a GUID to each record and then start tokenization.

For example, an incoming table include account IDs assigned to row IDs (e.g., row 1, row 2, etc.). The account ID is considered confidential. A GUID is generated and assigned to each account ID. The rows, which include the account ID and the original row ID, are reordered according to the GUIDs, and a new row ID is assigned to each row. The account IDs is then replaced with incremental token values based on the newly reordered rows (e.g., 00001, 0002, etc.)

Incremental Tokenization

In some cases, incremental value tokenization is referred as "Auto" in template configurations. This is like an identity numeric value generation in database. Increment max value by 1 (Max value+1).

In some cases, this tokenization mechanism will have ability to generate token with fixed length based on downstream datatype definitions.

An example token is generated for downstream system having Datatype length max of 10 characters.

For example, consider the data value: 0000000789. "789" is the Token value and 0000000 is appending zero for 7 characters to get max length of 10. Leading zeros will only be appended based on length of token. Appending zero will be Maximum length expected minus length of token.

In some cases, this tokenization can be used for Datatypes of Numeric and Alphanumeric. If downstream system has data types of numeric Token will be converted to 789 from above example.

In some cases, the file tokenization application will use C# datatype ULONG for storing token. Boundaries of ULONG datatype are 0 to 18,446,744,073,709,551,615. In an example aspect, the tokenization value is an unsigned 64-bit integer UInt64. unsigned long is an integer that cannot be negative and thus has a higher range of positive values.

In some cases, this mechanism is not used for tokenization of data elements that has dollar value. This tokenization will not give decimal values.

Postal Code Tokenization

Complete Postal Code Tokenization

In some cases, the entire postal code or zip code is replaced with a tokenized code.

In some cases, this tokenization will use Incremental value tokenization for numeric postal codes (e.g., US zip codes) and alphanumeric values for Canadian postal codes.

Canadian Postal Codes: This tokenization process has no dependency on postal code provided by source systems. Canadian postal code tokenization starts incremental alphanumeric values in the format of Canadian postal from A1A1A1 to Z9Z9Z9. This tokenization can support approximately 10 million unique postal code tokens. The token generation logic includes: (1) for first record postal code will be A1A1A1, and (2) after first record values in each position will be incremented (e.g., digits 1 to 9, characters A to Z). For example, if a max value in mapping file is A1A1Z9 then next token value will be A1A2A1. For example, the first source data postal code is L4K 4N4 and this is replaced with the first token in token series, which is A1A 1A1. A second sourced postal code is L2C 5J5 and this is replaced with the second token in the token series (e.g., incremented by one), which is A1A 1A2.

US Zip Codes: If postal code is numeric then system will treat the postal code as US postal code, if postal code is nonnumeric then system will treat it as Canadian postal code. For example, the first source data zip code is 522001 and this is replaced with the first token in token series, which is 000001. A second sourced postal code is 90201 and this is replaced with the second token in the token series (incremented by one), which is 000002.

Partial Postal Code Tokenization

In some cases, a portion of the postal code or zip code is replaced with a tokenized code. For example, only the first 3 characters of the last 3 characters are tokenized.

Empty String

In some cases, empty string process does not adhere to the conventional meaning of tokenization, but is a function to populate an empty value for any data element that is not required by downstream systems.

In some cases, some feeds in a database/data system have data elements identified as confidential/PII. These data elements are not used in the database/data system and these values doesn't need to be tokenized or used by client devices. In some cases, these feeds are shared with other systems, so it is not desirable or not possible to change data at a source system.

In some cases, for these data elements that are determined to be unnecessary, then the application 140 does not tokenize these data elements and instead populate these fields with empty strings.

In some cases, criteria for determining if data element is unnecessary include: (1) Data element doesn't need tokenization, or (2) Data element is not used in downstream systems, or both.

It will be appreciated that other computations for tokenization and detokenization can be applied to the processes described herein.

Referring to FIG. 9, example executable instructions 900 are provided that can be executed by a computing system. In some cases, the computing system runs the application 140.

The executable instructions 900 include the following.

Block 902: Obtain a data record comprising a plurality of groupings of data elements, each one of the plurality of groupings of data elements associated with a data type. In some cases, the plurality of groupings of data elements are a plurality of columns in a data record. In some cases, the data type corresponds to a data source.

Block 904: Select a first template for tokenization based on at least a first data type associated with a first given grouping of data elements from amongst the plurality of groupings of data elements, the first template comprising a first tokenization rule and a first detokenization rule.

Block 906: Tokenize at least a portion of each of the data elements in the first grouping of data elements according to the first tokenization rule, to generate a tokenized data record.

Block 908: Generate a tokenization file that is associated with the tokenized data record, the tokenization file comprising the first detokenization rule and the data record.

Block 910: Transmit the tokenized data record.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112*a*, or 112*b*). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for processing input data, the system comprising:

a memory, a communication interface, and a processor operatively coupled to the memory and the communication interface;

the processor configured to at least:

obtain a data record comprising a plurality of groupings of data elements, each one of the plurality of groupings of data elements associated with a data type;

select a first template for tokenization based on at least a first data type associated with a first given grouping of data elements from amongst the plurality of groupings of data elements, the first template comprising a first tokenization rule and a first detokenization rule;

tokenize at least a portion of each of the data elements in the first grouping of data elements according to the first tokenization rule, to generate a tokenized data record;

generate a tokenization file that is associated with the tokenized data record, the tokenization file comprising the first detokenization rule and the data record; and transmit the tokenized data record.

2. The system of claim 1, wherein the data record comprises a plurality of rows and a plurality of columns, and the plurality of groupings of data elements comprises a plurality of columns.

3. The system of claim 1, wherein the processor is further configured to:

select a second template for tokenization based on at least a second data type associated with a second given grouping of data elements from amongst the plurality of groupings of data elements, the second template comprising a second tokenization rule and a second detokenization rule;

tokenize a portion of each of the data elements in the second grouping of data elements according to the second tokenization rule, to further generate the tokenized data record;

add to the tokenization file the second detokenization rule; and wherein the second tokenization rule is different from the first tokenization rule, and the second detokenization rule is different from the first detokenization rule.

4. The system of claim 1 further configured to receive a plurality of data records, including the data record, from a plurality of different data sources, and wherein the processor is further configured to generate a plurality of tokenized data records corresponding respectively to the plurality of data records, and output the plurality of tokenized data records to a plurality of different client devices.

5. The system of claim 4, wherein the plurality of different data sources operate on at least two or more different operating systems.

6. The system of claim 1, wherein the processor is configured to: mask an ancillary portion of each of the data elements in the first grouping of data elements according to a first masking rule in the first template, and store a first demasking rule in the tokenization file.

7. The system of claim 1, wherein the data record comprises a plurality of rows and a plurality of columns, a given column comprises the first given grouping of data elements and the first given grouping of data elements are respectively assigned a plurality of original row IDs, and wherein the processor is further configured to:

generate a plurality of unique IDs in a new unique ID column assigned to each data element in the first given grouping of data elements and to each of the plurality of original row IDs;

sort the plurality of rows according to the plurality of unique IDs to generate a new ordering of the plurality of rows, and assign a plurality of new row IDs in a new row ID column according to the new ordering of the plurality of rows;

replace the first given grouping of data elements with a plurality of incremental token values based on the new ordering of the plurality of rows;

wherein the plurality of incremental token values and the plurality of new row IDs form at least part of the tokenized record.

8. The system of claim 1, wherein the processor is further configured to:

identify that a second given grouping of data elements, from amongst the plurality of groupings of data elements, satisfies one or more criteria for erasure; and replace each of the data elements in the second given grouping of data elements with an empty string.

9. The system of claim 8, wherein the tokenization file is unchanged by replacing each of the data elements in the second given grouping of data elements with the empty string.

10. The system of claim 1, wherein the tokenized data record is transmitted to a machine learning system.

11. A method for processing input data, the method executed in a computing environment comprising one or more processors and memory, and the method comprising:

obtaining a data record comprising a plurality of groupings of data elements, each one of the plurality of groupings of data elements associated with a data type;

selecting a first template for tokenization based on at least a first data type associated with a first given grouping of data elements from amongst the plurality of groupings of data elements, the first template comprising a first tokenization rule and a first detokenization rule;

tokenizing at least a portion of each of the data elements in the first grouping of data elements according to the first tokenization rule, to generate a tokenized data record;

generating a tokenization file that is associated with the tokenized data record, the tokenization file comprising the first detokenization rule and the data record; and transmitting the tokenized data record.

12. The method of claim 11, wherein the data record comprises a plurality of rows and a plurality of columns, and the plurality of groupings of data elements comprises a plurality of columns.

13. The method of claim 11, further comprising:

selecting a second template for tokenization based on at least a second data type associated with a second given grouping of data elements from amongst the plurality of groupings of data elements, the second template comprising a second tokenization rule and a second detokenization rule;

tokenizing a portion of each of the data elements in the second grouping of data elements according to the second tokenization rule, to further generate the tokenized data record;

adding to the tokenization file the second detokenization rule; and wherein the second tokenization rule is different from the first tokenization rule, and the second detokenization rule is different from the first detokenization rule.

14. The method of claim 11, further comprising: receiving a plurality of data records, including the data record, from a plurality of different data sources; generating a plurality of tokenized data records corresponding respectively to the plurality of data records; and outputting the plurality of tokenized data records to a plurality of different client devices.

15. The method of claim 14, wherein the plurality of different data sources operate on at least two or more different operating systems.

16. The method of claim 11, further comprising: masking an ancillary portion of each of the data elements in the first grouping of data elements according to a first masking rule in the first template, and store a first demasking rule in the tokenization file.

17. The method of claim 11, wherein the data record comprises a plurality of rows and a plurality of columns, a given column comprises to the first given grouping of data elements and the first given grouping of data elements are respectively assigned a plurality of original row IDs, and wherein the method further comprises:

generating a plurality of unique IDs in a new unique ID column assigned to each data element in the first given grouping of data elements and to each of the plurality of original row IDs;

sorting the plurality of rows according to the plurality of unique IDs to generate a new ordering of the plurality of rows, and assign a plurality of new row IDs in a new row ID column according to the new ordering of the plurality of rows;

replacing the first given grouping of data elements with a plurality of incremental token values based on the new ordering of the plurality of rows; and wherein the plurality of incremental token values and the plurality of new row IDs form at least part of the tokenized record.

18. The method of claim 11, further comprising:

identifying that a second given grouping of data elements, from amongst the plurality of groupings of data elements, satisfies one or more criteria for erasure; and replacing each of the data elements in the second given grouping of data elements with an empty string.

19. The method of claim 18, wherein the tokenization file is unchanged by replacing each of the data elements in the second given grouping of data elements with the empty string.

20. A non-transitory computer readable medium storing computer executable instructions which, when executed by at least one computer processor, cause the at least one computer processor to carry out a method for processing input data, and the method comprising:

obtaining a data record comprising a plurality of groupings of data elements, each one of the plurality of groupings of data elements associated with a data type;

selecting a first template for tokenization based on at least a first data type associated with a first given grouping of data elements from amongst the plurality of groupings of data elements, the first template comprising a first tokenization rule and a first detokenization rule;

tokenizing at least a portion of each of the data elements in the first grouping of data elements according to the first tokenization rule, to generate a tokenized data record;

generating a tokenization file that is associated with the tokenized data record, the tokenization file comprising the first detokenization rule and the data record; and transmitting the tokenized data record.

* * * * *